United States Patent [19]

Miyabayashi et al.

[11] Patent Number: 5,187,035
[45] Date of Patent: Feb. 16, 1993

[54] ELECTRODE FOR SECONDARY BATTERY

[75] Inventors: Mitsutaka Miyabayashi; Manabu Hayashi, both of Ami, Japan

[73] Assignee: Mitsubishi Petrochemical Co., Ltd., Tokyo, Japan

[21] Appl. No.: 709,973

[22] Filed: Jun. 4, 1991

[30] Foreign Application Priority Data

Jun. 4, 1990 [JP] Japan .................. 2-144550
Jun. 4, 1990 [JP] Japan .................. 2-144551
Jun. 4, 1990 [JP] Japan .................. 2-144552
Jun. 4, 1990 [JP] Japan .................. 2-144553

[51] Int. Cl.$^5$ .......................... H01M 10/40
[52] U.S. Cl. ...................... 429/218; 429/217; 429/194
[58] Field of Search .......... 429/217, 218, 194

[56] References Cited

U.S. PATENT DOCUMENTS

| 4,615,959 | 10/1986 | Hayashi et al. | 429/194 |
| 4,668,595 | 5/1987 | Yoshino et al. | 429/194 |
| 4,702,977 | 10/1987 | Hiratsuka et al. | 429/194 |
| 4,725,422 | 2/1988 | Miyabayashi et al. | 423/445 |
| 4,814,242 | 4/1989 | Maxfield et al. | 429/217 |
| 4,980,250 | 12/1990 | Takahashi et al. | 429/218 |

FOREIGN PATENT DOCUMENTS

0409192A1 1/1991 European Pat. Off. .
63-010462 1/1988 Japan .

OTHER PUBLICATIONS

Batteries and Energy Systems, Mantell, 1970 p. 192.

Primary Examiner—Olik Chaudhuri
Assistant Examiner—M. Nuzzolillo
Attorney, Agent, or Firm—Oblon, Spivak, McClelland, Maier & Neustadt

[57] ABSTRACT

Disclosed is an electrode for secondary battery, which comprises an alkali metal as the active substance carried on a carrier composed of (1) 100 parts by weight of a carbonaceous material satisfying the following conditions:
  (A) a hydrogen/carbon atomic ratio of less than 0.15 and
  (B) a spacing ($d_{002}$) of the (002) plane according to the X-ray wide angle diffraction method of 3.37 Å or more and a crystallite size in the c-axis direction of (Lc) of 5 Å or more, and
  0 to 70 parts by weight of a metal capable of forming an alloy with the active substance or an alloy of said metal and
(2) 0.1 to 40 parts by weight of a fibrous organic polymer as the binder, which can give a negative electrode having excellent charging and discharging cycle characteristics and good flexibility to obtain secondary battery having large charging capacity.

16 Claims, 1 Drawing Sheet

1

ELECTRODE FOR SECONDARY BATTERY

BACKGROUND OF THE INVENTION

This invention relates to an electrode for secondary battery having high capacity and excellent in charging and discharging characteristics. More specifically, it relates to a flexible electrode for alkali metal secondary battery which can constitute a cylindrical secondary battery as a coil-shaped electrode or a sheet-shaped secondary battery as a thin sheet-shaped electrode.

As the electrode for lithium secondary battery, it has been proposed to use an electroconductive polymer such as polyacetylene. However, an electroconductive polymer is insufficient in the doping amount of lithium ions, i.e. electrode capacity and stable charging and discharging characteristics.

Also, an attempt has been made to use lithium metal as the negative electrode of lithium secondary battery, but in this case, the charging and discharging cycle characteristics are extremely poor.

More specifically, during discharging of the battery, lithium moves as lithium ions from the negative electrode body into an electrolyte, while during charging, the lithium ions are again electrodeposited as metallic lithium onto the negative electrode. By repeating such charging and discharging cycle, the metallic lithium electrodeposited by accompaniment with such cycle becomes shaped in dendrite. Since the dendrite-shaped metallic lithium is a very active substance, it decomposes the electrolyte, thereby causing an inconvenience to occur that the charging and discharging cycle characteristics of the battery are deteriorated. Further, when this grows, the dendrite-shaped metallic lithium electrodeposited product finally reaches the positive electrode penetrating the separator, there ensues the problem of causing short-circuit phenomenon to occur. In other words, there ensues the problem that the charging and discharging cycle life is short.

For avoiding such problems, it has been attempted to constitute a negative electrode by using a carbonaceous material prepared by sintering an organic compound as a carrier material on which an alkali metal, particularly lithium is carried as the active substance. By using such negative electrode, the charging and discharging characteristics of the negative electrode could be dramatically improved. But on the other hand, an electrode molding material by use of this carbonaceous material as a carrier is poor in flexibility, and no satisfactory electrode shaped in sheet or coil could be obtained.

SUMMARY OF THE INVENTION

An object of the present invention is, under the state of the art as described above, to provide a negative electrode for secondary battery having large electrode capacity, excellent charging and discharging cycle characteristics, and also good flexibility.

The present inventors have studied intensively about the negative electrode in order to solve the problems as described above, and consequently found that an electrode constituted by a carrier comprising a mixture of a carbonaceous material and a fibrous organic polymer as a binder, and an active substance of an alkali metal, preferably lithium carried thereon is very effective for accomplishing the above object, to establish the present invention.

More specifically, the present invention is an electrode for secondary battery, comprising an alkali metal as the active substance carried on a carrier composed of (1) a carbonaceous material satisfying the following conditions:

(A) a hydrogen/carbon atomic ratio of less than 0.15 and (B) a spacing ($d_{002}$) of the (002) plane according to the X-ray wide angle diffraction method of 3.37 Å or more and a crystallite size in the c-axis direction (Lc) of 5 Å or more, and (2) a fibrous organic polymer.

The feature of the electrode for secondary battery of the present invention resides in that the negative electrode has the above constitution, and other elements can be constituted by the same as in the electrode for secondary battery of the prior art.

DESCRIPTION OF THE PREFERRED EMBODIMENTS

Figure 1:
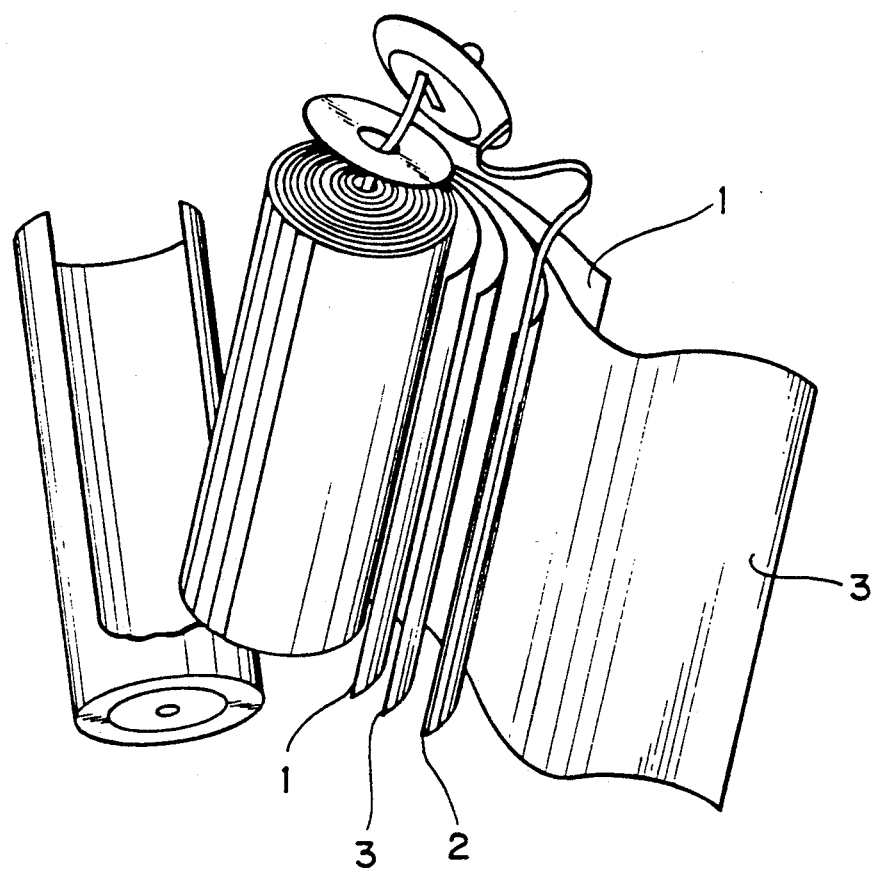
FIG. 1 is an illustration showing the constitution of the battery in Example 1, in which 1 shows a positive electrode, 2 shows a negative electrode and 3 shows a separator (including electrolyte).

In the negative electrode according to the present invention, the active substance is an alkali metal, preferably lithium. This active substance plys between, for example, in the case of lithium, Li ion and metal lithium accompanied by charging and discharging of the battery.

In the present invention, the carbonaceous material to be used for the carrier for an active substance, which constitutes the electrode material, has the following characteristics:

(1) the atomic ratio of hydrogen/carbon (H/C) is less than 0.15; and (2) the spacing ($d_{002}$) of the (002) plane according to the X-ray wide angle diffraction method is 3.37 Å or more and the crystallite size in the c-axis direction (Lc) is 5 Å or more. In the carbonaceous material, other atoms such as nitrogen, oxygen and halogen may be also present at a ratio of 7 mole % or less, preferably 4 mole % or less, particularly preferably 2 mole % or less.

H/C is preferably less than 0.10, more preferably less than 0.07, and particularly preferably less than 0.05.

The spacing ($d_{002}$) of the (002) plane is preferably 3.38 Å or more, more preferably 3.39 to 3.75 Å, further preferably 3.41 to 3.70 Å, particularly preferably 3.45 to 3.70 Å.

The crystallite size in the c-axis direction Lc is preferably 5 to 220 Å, more preferably 5 to 150 Å, further preferably 10 to 80 Å, and particularly preferably 12 to 70 Å, most preferably 15 to 70 Å.

When either one of these parameters, namely H/C, $d_{002}$ and Lc falls out of the above-specified ranges, the overvoltage during charging and discharging in the electrode becomes greater, whereby not only a gas is generated from the electrode to markedly impair safety of the battery, but also the charging and discharging cycle characteristics are lowered.

Further, the carbonaceous material to be used for the carrier of the electrode of the present invention preferably has the characteristics as described below.

That is, in the Raman spectrum analysis by use of an argon ion laser beam with a wavelength of 5145 Å, the G value as defined by the following formula:

$$G = \frac{\text{Integrated value of spectrum intensity in the wave number region of } 1580 \pm 100 \text{ cm}^{-1}}{\text{Integrated value of spectrum intensity in the wave number region of } 1360 \pm 100 \text{ cm}^{-1}}$$

is preferably less than 2.5, more preferably less than 2.0, particularly preferably from 0.2 to less than 1.2.

Here, G value refers to the integrated value (area intensity) of the spectrum intensity within the range of the wave number $1580\pm100$ cm$^{-1}$ divided by the area intensity within the range of the wave number $1360\pm100$ cm$^{-1}$ in the spectrum intensity curve recorded on the chart when Raman spectrum analysis is performed by use of an argon ion laser beam with a wavelength of 5145 Å for the above-mentioned carbonaceous material, and corresponds to a measure of the graphitization degree of the carbonaceous material.

In other words, the carbonaceous material has a crystalline portion and a non-crystalline portion, and the G value can be said to be a parameter indicating the ratio of the crystalline portion of the carbonaceous structure.

Further, the carbonaceous material to be used for the carrier of the electrode of the present invention desirably satisfies the following conditions.

That is, the two-fold distance $a_0 (=2d_{110})$ of the spacing ($d_{110}$) of the (110) plane in the X-ray wide angle diffraction analysis is preferably 2.38 Å to 2.47 Å, more preferably 2.39 Å to 2.46 Å, and the size (La) of the in the a-axis direction is preferably 10 Å or more, more preferably 15 Å to 150 Å, particularly preferably 19 Å to 70 Å.

The carbonaceous material may have any desired shape such as a particle or a fiber, but preferably a shape of a particle or a fiber.

In the case of a particle, the carbonaceous material preferably have a volume average particle size of 300 μm or less, more preferably 0.2 μm to 200 μm, further preferably 0.5 μm to 100 μm, particularly preferably 2 μm to 50 μm, most preferably 3 μm to 30 μm.

Further, the carbonaceous material has internally fine pores, and the total fine pore volume is preferably $1.5 \times 10^{-3}$ ml/g or more. More preferably, the total fine pore volume is $2.0\times10^{-3}$ ml/g or more, more preferably $3.0\times 10^{-3}$ to $8\times10^{-2}$ ml/g, particularly preferably $4.0\times10^{-3}$ to $3\times10^{-2}$ ml/g.

The total fine pore volume and the average fine pore radius as described below are determined by measuring the amount of the gas adsorbed onto the sample (or the amount of the gas released) under some equilibrium pressures by use of the quantitative volume method, and determined from the amount of the gas adsorbed on the sample.

The total fine pore volume is determined from the total amount of the gas adsorbed at a relative pressure $P/P_o=0.995$, supposing that the fine pores are filled with liquid nitrogen.

Here,

P: vapor pressure of adsorbed gas (mmHg) and
$P_o$: saturated vapor pressure of adsorbed gas at cooling temperature (mmHg).

Further, from the nitrogen gas amount adsorbed ($V_{ads}$), the liquid nitrogen amount ($V_{liq}$) filled in the fine pores is calculated by use of the following formula (1) to determine the total fine pore volume:

$$V_{liq} = \frac{P_a V_{ads} V_m}{RT} \quad (1)$$

Here, $P_a$ and T are atmospheric pressure (kgf/cm$^2$) and temperature (°K), R is the gas constant. $V_m$ is a molecular volume of the gas adsorbed (34.7 cm$^3$/mole for nitrogen).

The carbonaceous material to be used for the carrier of the electrode of the present invention has internally fine pores. The average fine pore radius ($\gamma_p$) is preferably 8 to 100 Å. More preferably, it is 10 to 80 Å, further preferably 12 to 60 Å, particularly preferably 14 to 40 Å.

The average fine pore radius ($_{65}p$) is determined from the $V_{liq}$ determined from the formula (1) as mentioned above and the BET specific area S by use of the following formula (2):

$$\gamma_p = \frac{2V_{liq}}{S} \quad (2)$$

Here, the fine pore is supposed to be cylindrical.

The carbonaceous material as described above can be generally obtained by carbonization of an organic compound by heating and decomposing it at a temperature of 300° to 3000°C. under an inert gas stream.

Specific examples of the organic compound which is the starting source may include any desired organic polymeric compound including cellulose resins; phenol resins; acrylic resins such as polyacrylonitrile and poly-(α-halogenated acrylonitrile); halogenated vinyl resins such as polyvinyl chloride, polyvinylidene chloride and chlorinated polyvinyl chloride; polyamideimide resins; polyamide resins; conjugated resins such as polyacetylene and poly(p-phenylene): condensed cyclic hydrocarbon compounds comprising two or more monocyclic hydrocarbon compounds having 3 or more membered ring such as naphthalene, phenanthrene, anthracene, triphenylene, pyrene, chresene, naphthacene, picene, perylene, pentaphene and pentacene condensed mutually to each other, or derivatives of the above-mentioned compounds such as carboxylic acids, carboxylic acid anhydrides, carboxylic acid imides, various pitches composed mainly of mixtures of the above-mentioned respective compounds such as crude oil, ethylene heavy end pitch, asphalt, decomposed pitch and coal tar pitch: condensed heterocyclic compounds comprising 2 or more heteromonocyclic compounds having 3 or more membered ring such as indole, isoindole, quinoline, isoquinoline, quinoxaline, phthalazine, carbazole, acridine, phenazine, phenathridine bonded together to each other, or bonded to one or more monocyclic hydrocarbon compound having 3 or more membered ring, derivatives of the above-mentioned respective compounds such as carboxylic acids, carboxylic acid anhydrides, carboxylic acid imides; further benzene and derivatives thereof such as carboxylic acids, carboxylic acid anhydrides, carboxylic acid imides, namely 1,2,4,5-tetracarboxylic acid, dianhydride thereof, or diimide thereof.

Also, monocyclic aromatic hydrocarbons such as benzene, toluene and xylene, derivatives thereof such as carboxylic acids and carboxylic acid imides, aliphatic saturated hydrocarbons such as propane and aliphatic unsaturated hydrocarbons such as butadiene may be used as a starting material.

The carrier constituting the electrode for secondary battery of the present invention comprises a mixture of the above carbonaceous material and the fibrous organic polymer as a binder. The fibrous organic polymer is integrated intertwinedly to the particles of the above carbonaceous material whereby a shape as the carrier is retained.

The carrier constituting the electrode for secondary battery of the present invention can be prepared by adding a metal capable of forming an alloy with the active substance or an alloy containing said active substance to the above carbonaceous material and mixing it with the fibrous organic polymer.

As the active substance, an alkali metal, preferably lithium is used. It is more preferred to use an alloy of lithium or to use lithium in combination with a metal capable of forming an alloy therewith.

The composition (molar composition) of the alloy is, for example, in the case of lithium alloy, represented by $Li_xM$ (where x represents a molar ratio relative to the metal M). As the metal to be used as M, there may be mentioned, for example, aluminum (Al), lead (Pb), zinc (Zn), tin (Sn), bismuth (Bi), indium (In), magnesium (Mg), gallium (Ga), cadmium (Cd), silver (Ag), silicon (Si), boron (B), gold (Au), platinum (Pt), palladium (Pd) and antimony (Sb), preferably Al, Pb, In, Bi and Cd, more preferably Al, Pb and In, particularly preferably Al.

In the alloy, elements other than the metals as described above may be further contained in the range of 50 mole % or less.

In $Li_xM$, it is preferred that x satisfies $0 < x \leq 9$, more preferably $0.1 \leq x \leq 5$, further preferably $0.5 \leq x \leq 3$, particularly preferably $0.7 \leq x \leq 2$.

As the alloy ($Li_xM$) of the active substance, one or more alloys can be used.

As the metal capable of forming an alloy with the active substance, one or more of the above metals M can be used.

The metal capable of forming an alloy with the active substance (M) or the alloy of the active substance ($Li_xM$) is present in the form of a particle or attached to the above carbonaceous material.

The mixing ratio of the above carbonaceous material to the metal capable of forming an alloy with said active substance (M) or the alloy of the said active substance ($Li_xM$) is preferably 70 parts by weight or less, more preferably 2 parts by weight to 60 parts by weight, further preferably 5 parts by weight to 50 parts by weight, particularly preferably 10 parts by weight to 45 parts by weight, most preferably 15 parts by weight to 40 parts by weight of the metal capable of forming an alloy with the active substance or the alloy of the active substance based on 100 parts by weight of the carbonaceous material.

The particles of such metals preferably have a volume average particle size of 0.2 µm to 200 µm, more preferably 0.3 µm to 150 µm, further preferably 0.5 µm to 100 µm, particularly preferably 1 µm to 60 µm.

Further, the metal capable of forming an alloy with the active substance (M) or the alloy of the active substance ($Li_xM$) can be present in the form of a thin layer coated on the surface Of the particle of the above carbonaceous material.

Or else, the metal capable of forming an alloy with the active substance (M) or the alloy of the active substance ($Li_xM$) can be incorporated internally of the particle of the above carbonaceous material.

The above carbonaceous material which may be particulate or fibrous form, and the metal capable of forming an alloy with the granular active substance (M) or the alloy of the active substance ($Li_xM$) can be mixed mechanically.

As the method for coating the metal capable of forming an alloy with the active substance (M) or the alloy ($Li_xM$) as a thin layer on the surface of the particle or fiber of the above carbonaceous material, there may be included the vapor deposition method, the plating method and the flame spraying method.

As the method for incorporating the metal capable of forming an alloy with the active substance (M) or the alloy of the active substance ($Li_xM$) internally in the particle or fiber of the above carbonaceous material, there may be used the method in which an organic metallic compound of the metal (M) is impregnated internally in the particle or fiber of the carbonaceous material and then pyrolyzing them, and the method in which an organic compound is pyrolyzed by use of the particle of the metal (M) as a nucleus to carbonize them.

The average diameter of the fibrous organic polymer is preferably 30 µm or less, more preferably 20 µm or less, further preferably 15 µm or less, most preferably 10 µm or less. The average length of the fiber is preferably 100 mm or less, more preferably 70 mm or less, further preferably 0.3 mm to 50 mm, particularly preferably 0.5 mm to 20 mm, most preferably 0.7 mm to 5 mm.

Particularly preferred form of the fibrous organic polymer comprises a fine fiber (fibril) having an average diameter of less than 10 µm, preferably 5 µm or less, particularly preferably 3 µm or less.

Or else, the fibrous organic polymer may be shaped in fibrid (a powdery material having ultrafine tentacular fibrils).

In either case, the average diameter of the fibrous organic polymer is preferably ⅔ or less, more preferably 3/5 or less, further preferably 1/100 to ½ particularly preferably 1/10 to ⅓ of the average particle size of the particle of the carbonaceous material.

When the carbonaceous material is also fibrous, the average fiber diameter of the fibrous organic polymer is preferably ⅔ or less, more preferably 3/5 or less, further preferably 1/100 to ½, particularly preferably 1/10 to ⅓ of the average diameter of the fibrous carbonaceous material.

Such fine fibers are intertwined to integrate the particle or fiber of the above carbonaceous material.

The fibrous organic polymer preferably contains no fluorine atom since a fluorine atom may have a possibility of reacting with an alkali metal which is the active substance.

As the fibrous organic polymer to be used in the present invention, there may be mentioned polyolefins such as polyethylene, polypropylene, a copolymer of ethylene and α-olefin having 3 to 12 carbon atoms, a copolymer of ethylene and vinyl acetate, a copolymer of propylene and ethylene, a copolymer of propylene and o-olefin having 4 to 12 carbon atoms; polyesters such as polyethylene terephthalate; and polyamide.

The organic polymer to be used in the present invention is preferably a polymer containing no fluorine atom as mentioned above.

The fibrous organic polymer of the present invention may have a two-layered structure composed of a core portion and a sheath portion. At the outermost layer of the sheath portion, an organic polymer having a low melting point or low softening point can be used. By adhering it by heat, the shape of the above carrier can be retained more strongly and flexibly.

The fibrous organic polymer having a two-layered structure comprises at least two organic polymeric components, generally comprises two kinds of organic polymers, and these organic polymers constitute a core portion and a sheath portion surrounding the core portion, respectively. The fibrous organic polymer generally has a two-layered structure composed of a core portion and a sheath portion, but may have a multi-layered structure having two or more layers of a sheath portion.

The organic polymer which is a component to be used for the core portion of the fiber has a melting point or softening point higher than that of the organic polymer which is a component of the sheath portion surrounding the core portion.

When the sheath portion is composed of two or more layers, the organic polymer of the outermost layer has the lowest melting point or softening point.

In the outermost layer of the sheath portion constituting the fiber, it is preferred to use an organic polymer containing no fluorine atom since a fluorine atom in the organic polymer may react with an alkali metal which is the active substance.

In the fibrous organic polymer, the ratio of the core portion to the sheath portion can be set as desired, but the diameter of the core portion is preferably 1/10 to 9/10, more preferably ⅛ to 8/10, further preferably ¼ to 7/10 of the diameter of the fiber.

The formulation ratio of the above carbonaceous material to the fibrous organic polymer is 0.1 to 40 parts by weight, preferably 0.1 to 30 parts by weight, further preferably 0.2 to 20 parts by weight, particularly preferably 0.3 to 10 parts by weight, most preferably 0.5 to 7 parts by weight of the fibrous organic polymer based on 100 parts by weight of the above carbonaceous material.

The single layered ultrafine fiber of the organic polymer having a diameter of less than 10 $\mu$m, further 5 $\mu$m or less, particularly 3 $\mu$m or less can be prepared according to the following methods.

(1) Solution flash method

The method in which an organic polymer solution is jetted explosively from a high pressure side to a low pressure side to obtain a net-shaped ultrafine fiber at a temperature higher than a boiling point of the solvent thereof.

(2) Emulsion flash spinning method

The method in which a dispersion of an organic polymer liquid is jetted, or a dispersion of a heat-softened particle of an organic polymer is jetted to obtain an ultrafine fiber.

(3) Melt blow method

The method in which a melt of an organic polymer is blown away by a gas with a high speed to obtain an ultrafine fiber.

(4) Turbulence molding method

The method in which an organic polymer solution is coagulated under turbulence condition to which shear force is applied to obtain an ultrafine fiber.

(5) Polymer arranged fiber dissolution method

The method in which from a polymer arranged fiber in which, at the section of the fiber, one component (island) is highly distributed into another component (sea) and components are uniformly continued in the fiber axis direction, the sea component is dissolved out to obtain an ultrafine fiber.

Further, the fibrous organic polymer having a two-layered structure can be prepared by extruding a strand in which a material forming a sheath portion is covered at around of a material forming a core portion, and effecting melt stretching or cooling stretching.

The above carbonaceous material may have any desired shape such as a particle and a fiber as described above, but preferably a shape of a particle. The particle of the carbonaceous material and the fibrous organic polymer are mixed mechanically, and the mixture can be molded into a sheet-shaped electrode according to a working method such as roll molding and compression molding.

The mixture can be also molded into a sheet-shaped electrode by adhering a wire mesh made of a metal such as nickel to the above mixture as a current collector and a support at the time of molding.

As the active substance, an alkali metal, preferably lithium is used. It is more preferred to use an alloy of lithium or to use lithium in combination with a metal capable for forming an alloy therewith.

As the method of carrying the active substance, there are the chemical method, the electrochemical method and the physical method. For example, it is possible to apply the method in which the carrier is dipped in an electrolyte containing alkali metal cations, preferably lithium ions of predetermined concentrations, and lithium is used as an opposite electrode to carry out electrolytic impregnation with the carrier as the anode, the method in which alkali metal powder, preferably lithium or lithium alloy powder is mixed in the process of obtaining a molded product of the carrier.

Or else, a sheet of an alkali metal, preferably lithium is sticked to a molded product of the carrier to make an electrode, and the electrode was integrated in the battery, followed by charging and discharging, to carry an alkali metal, preferably lithium.

An amount of the alkali metal, preferably lithium thus previously carried on the negative electrode carrier may be preferably 0.030 to 0.250 part by weight, more preferably 0.060 to 0.20 part by weight, further preferably 0.070 to 0.15 part by weight, particularly preferably 0.075 to 0.12 part by weight, most preferably 0.080 to 0.100 part by weight, per 1 part by weight of the carrier.

The electrode for secondary battery of the present invention is generally used as the negative electrode and opposed to a positive electrode through an intermediary separator.

Since the electrode for secondary battery of the present invention is excellent in flexibility and flexural strength, it can be applied as the electrode for various batteries of sheet shape, square shape and cylindrical shape.

For example, as shown in FIG. 1, the positive electrode body 1 and the negative electrode body 2 of the present invention can be rolled in shape of coil in the form opposed to each other with an intermediary separator 3, which are housed in a cylindrical vessel to form a cylindrical secondary battery.

The material of the above positive electrode is not particularly limited, but, for example, it is preferred to be composed of a metal chalcogen compound which release or obtain an alkali metal cation such as Li ion accompanied by the charge-discharge reaction. As such a metal chalcogen compound, there may be mentioned an oxide of vanadium, a sulfide of vanadium, an oxide of molybdenum, a sulfide of molybdenum, an oxide of manganese, an oxide of chromium, an oxide of titanium, a sulfide of titanium, a complexed material of the above oxides and a complexed material of the above sulfides. Preferably used are $Cr_3O_8$, $V_2O_5$, $V_6O_{13}$, $VO_2$, $Cr_2O_5$, $MnO_2$, $TiO_2$, $MoV_2O_5$, $TiS_2$, $V_2S_5$, $MoS_2$ $MoS_3$, $VS_2$, $Cr_{0.25}V_{0.75}S_2$ and $Cr_{0.5}V_{0.5}S_2$. Also, there may be used an oxide such as $LiCoO_2$ and $WO_3$; a sulfide such as CuS, $Fe_{0.25}V_{0.75}S_2$ and $An_{0.1}CrS_2$; a phosphor and sulfur-containing compound such as $NiPS_3$ and $FePS_3$; and a selenium compound such as $VSe_2$ and $NbSe_3$.

Also, an electroconductive polymer such as polyaniline and polypyrrole can be used.

The separator 3 for holding the electrolyte is formed by a material excellent in liquid holding characteristic such as nonwoven fabric of polyolefin resin. The separator 3 is impregnated with a non-aqueous electrolytic solution with a predetermined concentration comprising an electrolyte such as $LiClO_4$, $LiBF_4$, $LiAsF_6$ and $LiPF_6$ dissolved in an aprotic organic solvent such as propylene carbonate, 1,3-dioxorane and 1,2-dimethoxyethane.

It is also possible to have a solid electrolyte which is a conductor for alkali metal ions such as lithium ion interposed between the positive electrode body and the negative electrode body.

In the secondary battery thus constituted, at the negative electrode, active substance ions are carried onto the carrier during charging, and the active substance ions in the carrier are released during discharging, whereby the electrode reaction of charging and discharging proceeds.

On the other hand, when the metal chalcogen compound is used at the positive electrode, the active substance ions are released to the positive electrode body during charging, and the active substance ions are carried during discharging, whereby the electrode reaction of charging and discharging proceeds.

When an electroconductive polymer such as polyaniline is employed as the positive electrode, counter ions of the active substance ions are carried on the positive electrode body during charging, and the counter ions of the active substance ions released from the positive electrode body during discharging, whereby the electrode reaction proceeds.

As described above, the battery reaction accompanied with charging and discharging proceeds according to the combination of the electrode reactions of the positive electrode body and the negative electrode body.

The electrode for secondary battery of the present invention comprises an alkali metal, preferably lithium carried on a carrier composed of the particle of the carbonaceous material as described above and the fibrous organic polymeric binder, which can be formed into a shape of flexible sheet-shaped electrode, and this can be applied in a coil shape to a cylindrical secondary battery, and also as the electrode for thin sheet-shaped battery and square battery, thereby providing an electrode enabling secondary battery having high capacity, high output and excellent charging and discharging characteristics.

EXAMPLES

In the following, the present invention will be described by referring to Examples and Comparative examples. The present invention is not limited by the examples.

In the present invention, the respective measurements of elemental analysis and X-ray wide angle diffraction were practiced according to the following methods.

Elemental analysis:

A sample was dried under reduced pressure at 120° C. for about 15 hours, then dried by placing on a hot plate in a dry box at 100° C. for 1 hour. Subsequently, the dried sample was sampled in an aluminum cup in an argon atmosphere, and the carbon content was determined from the weight of the $CO_2$ gas generated by combustion, and the hydrogen content from the weight of the $H_2O$ generated. In Examples of the present invention as described below, measurement was conducted by use of Perkin Elmer 240 C Model Elemental Analyzer.

X-ray wide angle diffraction:

(1) Spacing ($d_{002}$) of the (002) plane and spacing ($d_{110}$) of the (110) plane;

As such, when the Carbonaceous material is powder, or powdered by an agate mortar when it is fine flake, high purity silicon powder for X-ray standard is mixed as internal standard substance in an amount of about 15 % by weight based on the sample, filled in a sample cell, and the wide angle X-ray diffraction curve is measured by the reflection system diffractometer method with the $CuK\alpha$ line monochromated by a graphite monochromator as the line source. For correction of the curve, none of the corrections concerned with the so-called Rorentz, polarizing light factor, absorption factor and atomic scattering factor were done, but the following simplified method was employed. That is, the baselines for the curve corresponding to (002) and (110) diffractions are drawn, and the substantive intensity from the baseline is plotted again to obtain the corrected curves of the (002) plane and the (110) plane. The middle point of the segment of the line in parallel to the angle axis drawn at ⅔ of the peak height of the curve crossing the diffraction curve was determined, the angle of the middle point corrected with the internal standard, which was made 2-fold of the diffraction angle, and $d_{002}$ and $d_{110}$ were determined from the wavelength Å of the $CuK\lambda$ line according to the Bragg's formula shown below.

$$d_{002} = \frac{\lambda}{2\sin\theta} [\text{Å}];$$

$$d_{110} = \frac{\lambda}{2\sin\theta'} [\text{Å}]$$

$\lambda: 1.5418$ Å

$\theta$ and $\theta'$: diffraction angles corresponding to $d_{002}$ and $d_{110}$.

(2) Sizes of crystallites in the c-axis and a-axis directions: Lc; La:

In the corrected diffraction curves obtained in the previous item, by use of the so-called half-value width $\beta$ at the position of half of the peak height, the sizes of the crystallites in the c-axix and the a-axis directions were determined from the following formulae:

$$Lc = \frac{K \cdot \lambda}{\beta \cdot \cos\theta} [\text{Å}],$$

$$La = \frac{K \cdot \lambda}{\beta \cdot \cos\theta'} [\text{Å}].$$

For the shape factor K, 0.90 was employed. $\lambda$, $\theta$ and $\theta'$ have the same meanings as in the previous item.

EXAMPLE 1

(1) Preparation of carbonaceous material

Granules of a crystalline cellulose (average radius: about 1 mm) were set in an electrical heating furnace, elevated up to a temperature of 1000° C. at an elevation rate of 250 ° C./hour under nitrogen gas stream, and further maintained at 1000° C. for one hour.

Then, after left to cool, the resulting particles of the carbonaceous material were set in a separate electrical furnace, elevated up to 1800° C. at an elevation rate of 1000° C./hour under nitrogen gas stream, and further maintained at 1800° C. for one hour.

The carbonaceous material thus obtained was placed in an agate mortar of 500 ml, 2 balls made of an agate of 30 mm in diameter, 6 balls of an agate of 25 mm in diameter and 16 balls of an agate of 20 mm in diameter were placed therein, followed by pulverization for 3 minutes.

The carbonaceous material obtained has the characteristics shown below as the result of analyses of elemental analysis and X-ray wide angle diffraction, and measurements of particle size distribution and specific surface area.

Hydrogen/carbon (atomic ratio) = 0.04
$d_{002}$ = 3.59 Å, Lc = 14 Å, $a_0$ (2 $d_{110}$) = 2.41 Å,
La = 25 Å, Volume average particle size = 40 μm,
Specific surface area (BET) = 8.2 m²/g.

(2) Molding of sheet-shaped electrode

A polypropylene fiber of 0.03 denier having been cut into a length of 10 mm was dispersed in water. To the dispersion, the particles of the carbonaceous material mentioned above was added in an amount of 90 parts by weight based on 10 parts by weight of the polypropylene cut fiber, and then mixed.

The mixture was coated on a wire mesh of 100 mesh made of nickel. After drying, molding by adhesion was effected at 180° C. to form a sheet-shaped carrier having a thickness of 0.4 mm.

(3) Carrying lithium on carrier material

Using the above carrier material as one electrode and lithium metal as an opposite electrode, electrolysis treatment was carried out in a propylene carbonate solution containing 1 mole/liter of LiClO₄ to obtain a negative electrode body by carrying lithium which is an active substance. Conditions of the electrolysis were the bath temperature of 20° C. and the current density of 0.7 mA/cm² whereby lithium corresponding to 560 mAh was carried on the negative electrode body.

(4) Preparation of positive electrode body 10 g by of MnO₂ powder sintered at 470° C. and 1 g of powdery polytetrafluoroethylene were kneaded and the kneaded product was subjected to roll molding to form a sheet having a thickness of 0.4 mm.

(5) Assembly of battery

A sheet-shaped electrode carrying lithium on the carrier material comprising a mixture of the carbonaceous material and the fibrous organic polymer was used as a negative electrode and after a polypropylenic nonwoven fabric was mounted as the separator, a sheet-shaped electrode comprising the above MnO₂ was laminated as a positive electrode. This laminate was mounted in a cylindrical can made of stainless with a shape of spiral by rolling up it as shown in FIG. 1.

By impregnating a propylene carbonate solution containing 1 mole/liter of LiClO₄ to the separator, and sealing the battery cell, a battery cell shown in FIG. 1 was assembled.

(6) Characteristics of the battery

With respect to the battery thus prepared, discharging was carried out with a constant current of 20 mA until the battery voltage became 1.0V. Thereafter, charging was carried out with a constant current of 20 mA until the battery voltage became 3.3V, and then preliminary charging and discharging was practiced for 5 cycles with voltage regulations of 3.3V upper limit and 1.8V lower limit and the constant current of 20 mA.

Thereafter, charging and discharging were repeated between 3.3V and 1.8V with a constant current of 20 mA to carry out cycle evaluation. Characteristics at the 6th cycle and at 60th cycle are shown in Table 1.

COMPARATIVE EXAMPLE 1

The battery was constituted in the same manner as in Example 1 except for using a lithium metal sheet in place of the negative electrode in Example 1.

The characteristics of the battery are shown in Table 1.

At the 60th cycle, the coulomb efficiency of Comparative example 1 is lowered significantly, but the coulomb efficiency of Example 1 is substantially not changed as compared with those at the 6th cycle.

TABLE 1

|  | 6 cycles | | | 60 cycles | | |
| --- | --- | --- | --- | --- | --- | --- |
|  | Charged capacity (mAh) | Discharged capacity (mAh) | Coulomb efficiency (%) | Charged capacity (mAh) | Discharged capacity (mAh) | Coulomb efficiency (%) |
| Example 1 | 418 | 408 | 97.6 | 418 | 408 | 97.5 |
| Comparative example 1 | 420 | 390 | 92.8 | 320 | 157 | 49.0 |

EXAMPLE 2

A complexed fibrous organic polymer having a diameter of 2 denier and a cut length of 5 mm, having a two-layered structure composed of a core portion comprising polyester having a melting point of 250° C. and a sheath portion comprising polyethylene having a melting point of 110° C. was dispersed in water. To the dispersion, the particles of the carbonaceous material obtained in Example 1 was added in an amount of 90 parts by weight based on 10 parts by weight of the above polyester/polyethylene complexed fiber, and then mixed.

By using the mixture as a carrier, the battery was assembled in the same manner as in Example 1, and the characteristics were measured.

The results are shown in Table 2.

COMPARATIVE EXAMPLE 2

The battery was constituted in the same manner as in Example 2 except for using a lithium metal sheet in place of the negative electrode in Example 2.

The characteristics of the battery are shown in Table 2.

At the 60th cycle, the coulomb efficiency of Comparative example 2 is lowered significantly, but the coulomb efficiency of Example 2 is substantially not changed as compared with those at the 6th cycle.

COMPARATIVE EXAMPLE 3

The battery was constituted in the same manner as in Example 3 except for using a lithium metal sheet in place of the negative electrode in Example 2.

The characteristics of the battery are shown in Table 3.

At the 60th cycle, the coulomb efficiency of Comparative example 3 is lowered significantly, but the coulomb efficiency of Example 3 is substantially not changed as compared with those at the 6th cycle.

TABLE 3

| | 6 cycles | | | 60 cycles | | |
|---|---|---|---|---|---|---|
| | Charged capacity (mAh) | Discharged capacity (mAh) | Coulomb efficiency (%) | Charged capacity (mAh) | Discharged capacity (mAh) | Coulomb efficiency (%) |
| Example 3 | 580 | 570 | 98.2 | 578 | 568 | 98.2 |
| Comparative example 3 | 420 | 390 | 92.8 | 320 | 157 | 49.0 |

TABLE 2

| | 6 cycles | | | 60 cycles | | |
|---|---|---|---|---|---|---|
| | Charged capacity (mAh) | Discharged capacity (mAh) | Coulomb efficiency (%) | Charged capacity (mAh) | Discharged capacity (mAh) | Coulomb efficiency (%) |
| Example 2 | 420 | 409 | 97.3 | 418 | 406 | 97.2 |
| Comparative example 2 | 420 | 390 | 92.8 | 320 | 157 | 49.0 |

EXAMPLE 3

An aluminum particle having a volume average particle size of 15 μm was added in an amount of 30 parts by weight based on 100 parts by weight of the particles of the carbonaceous material obtained in Example 1, and mixed mechanically.

Subsequently, a complexed fiber having a diameter of 2 denier and a cut length of 5 mm, having a two-layered structure composed of a core portion comprising polyester having a melting point of 250° C. and a sheath portion comprising polyethylene having a melting point of 110° C. was added in an amount of 10 parts by weight based on 100 parts by weight of the above mixture of the carbonaceous material and the aluminum particle, and mixed mechanically. While rolling by use of a roller, adhesion of the mixture to a wire mesh of 100 mesh made of nickel was carried out at a temperature of 120° C. to form a sheet-shaped carrier having a thickness of 0.4 mm.

Using the above carrier material as one electrode and lithium metal as an opposite electrode, electrolysis treatment was carried out in a propylene carbonate solution containing 1 mole/liter of $LiClO_4$ to obtain a negative electrode body by carrying lithium which is an active substance. Conditions of ht electrolysis were the bath temperature of 20° C. and the current density of 0.7 mA/cm² whereby lithium corresponding to 830 mAh was carried on the negative electrode body.

By using the negative electrode body obtained, the battery was constituted in the same manner as in Example 1, and the characteristics were measured.

The results are shown in Table 3.

We claim:

1. An electrode for secondary battery, comprising an alkali metal as the active substance carried on a carrier composed of
   (1) 100 parts by weight of a carbonaceous material in the shape of a particle or fiber satisfying the following conditions:
      (A) a hydrogen/carbon atomic ratio of less than 0.15 and
      (B) a spacing ($d_{002}$) of the (002) plane according to the X-ray wide angle diffraction method of 3.37 Å or more and a crystallite size in the c-axis direction (Lc) of 5 Å or more,
      (C) a total fine pore volume of $1.5 \times 10^{-3}$ ml/g or more, and
   0 to 70 parts by weight of a metal capable of forming an alloy with the active substance or an alloy of said metal and
   (2) 0.1 to 40 parts by weight of a fibrous organic polymer as the binder, the average diameter of the fibrous organic polymer being ⅔ or less than the average particle size of the particles of the carbonaceous material.

2. The electrode according to claim 1, wherein the carbonaceous material is a carbonaceous material having a G value as defined by the following formula in the Raman spectrum analysis by use of an argon ion laser beam with a wavelength of 5145 Å or less than 2.5:

$$G = \frac{\text{Integrated value of spectrum intensity in the wave number region of } 1580 \pm 100 \text{ cm}^{-1}}{\text{Integrated value of spectrum intensity in the wave number region of } 1360 \pm 100 \text{ cm}^{-1}}$$

3. The electrode according to claim 2, wherein the carbonaceous material is a carbonaceous material having a two-fold distance ($a_0$) of a spacing ($d_{110}$) of the (110) plane in the X-ray wide angle diffraction method of 2.38 to 2.47 Å.

4. The electrode according to claim 1, wherein the carbonaceous material has an average fine pore radius ($\gamma_p$) of 8 to 100 Å.

5. The electrode according to claim 1, which comprises 0.1 to 30 parts by weight of the fibrous organic polymer based on 100 parts by weight of the carbonaceous material.

6. The electrode according to claim 1, which comprises 100 parts by weight of the carbonaceous material and 2 to 60 parts by weight of the metal capable of forming an alloy with the active substance or the alloy of said metal and the active substance.

7. The electrode according to claim 6, wherein the metal capable of forming an alloy with the active substance or the alloy containing the active substance is at least one metal selected from Al, Pb, In, Bi and Cd, or an alloy of said metal and an alkali metal.

8. The electrode according to claim 6, which comprises a mixture of 100 parts by weight of the carbonaceous material and 5 to 50 parts by weight of the metal capable of forming an alloy with the active substance or the alloy containing the active substance.

9. The electrode according to claim 1, wherein the fibrous organic polymer is a fiber having an average diameter of 30 μm or less.

10. The electrode according to claim 9, wherein the organic polymer is polyolefin, polyester or polyamide.

11. The electrode according to claim 9, wherein the organic polymer is composed of a core portion and a sheath portion, and an organic polymer at the core portion has a melting point or softening point higher than an organic polymer at the sheath portion.

12. The electrode according to claim 1, wherein the carbonaceous material has a volume average particle size of 300 μ or less.

13. The electrode according to claim 1, wherein the fibrous organic polymer contains no fluorine atom.

14. The electrode according to claim 1, wherein the fibrous organic polymer is a fine fiber having an average diameter of less than 10 μm.

15. The electrode according to claim 1, wherein said electrode is a sheet-shaped electrode.

16. The electrode according to claim 1, wherein said electrode is rolled in the shape of a coil.

* * * * *